Dec. 26, 1922.
C. W. R. CAMPBELL ET AL.
PRODUCTION OF MOVING PICTURES.
FILED NOV. 30, 1915.
1,440,004
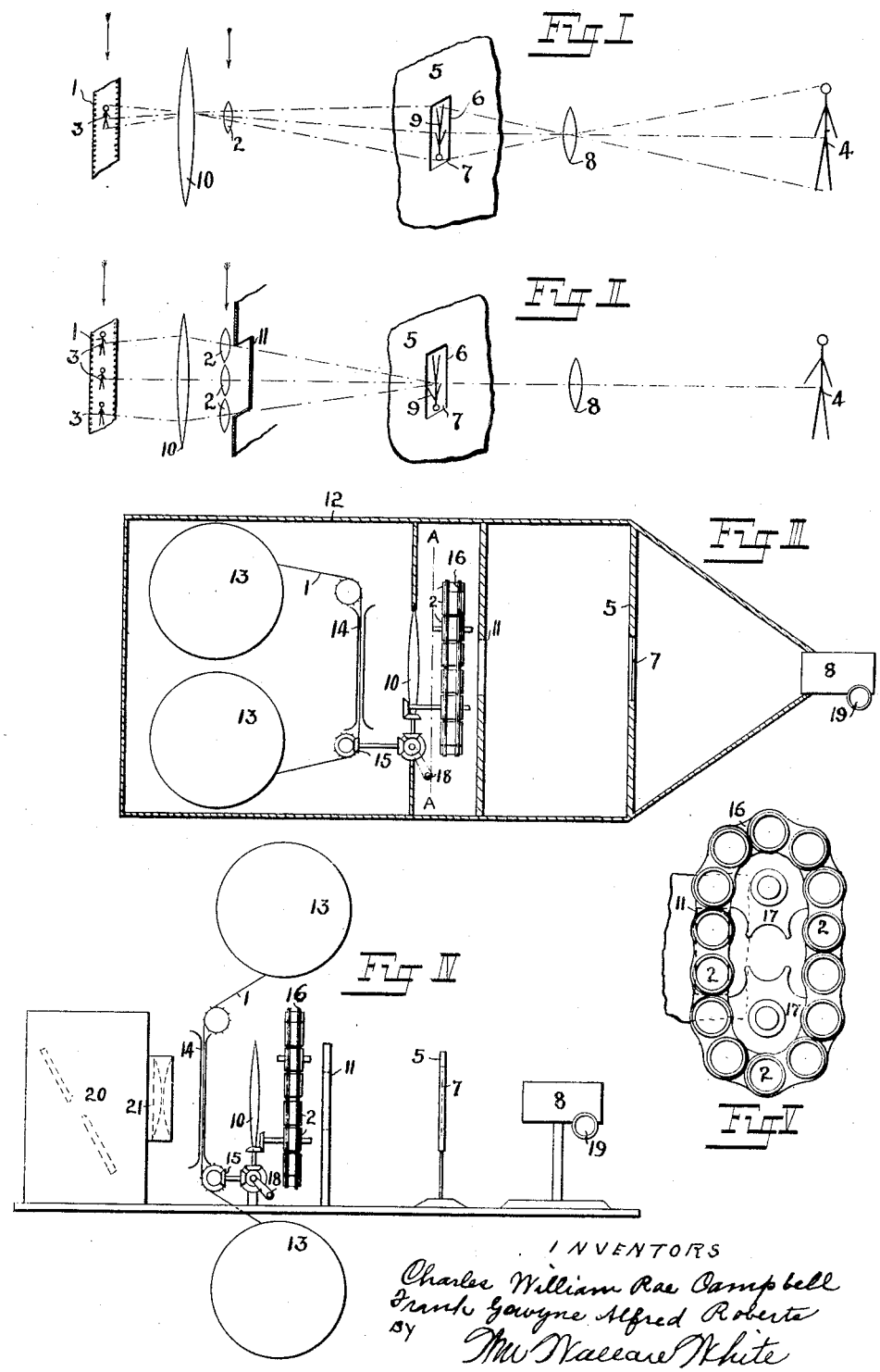

Patented Dec. 26, 1922.

1,440,004

UNITED STATES PATENT OFFICE.

CHARLES W. R. CAMPBELL, OF GERMISTON, AND FRANK G. A. ROBERTS, OF PARKTOWN, JOHANNESBURG, TRANSVAAL, SOUTH AFRICA.

PRODUCTION OF MOVING PICTURES.

Application filed November 30, 1915. Serial No. 64,326.

*To all whom it may concern:*

Be it known that CHARLES WILLIAM REA CAMPBELL, resident of Driehoek, Germiston, Transvaal, and FRANK GOWYNE ALFRED ROB-ERTS, resident of corner of Victoria and St. Patricks Avenues, Parktown, Johannesburg, Transvaal, both British subjects, have invented certain new and useful Improvements in the Production of Moving Pictures, of which the following is a specification.

The present invention relates to the photographic production of series of pictures and their projection as moving pictures, by means of apparatus including several lenses moving with a continuously moving picture support (herein called a film) such apparatus exposing several film pictures simultaneously so that, in projecting, the images of several pictures are superimposed on the screen; and in photographing, several pictures are being taken at any moment.

In such apparatus, each of the moving lenses tends, when photographing, to project its image onto the part of the film reserved for the adjacent pictures, or, in projecting, to project the adjacent picture as well as its own. It is therefore necessary to provide suitable masking means to prevent such occurrences and the object of this invention is to provide a simple form of such masking means.

In the accompanying drawings:

Figs. I and II are diagrams illustrating the invention.
Figs. III and IV show the invention embodied in a camera and projector respectively.

Fig. V is a section on A A Fig. III.

In Fig. I, 1 indicates a continuously moving film, and 2 a lens moving with the film and forming thereon the image 3 of an object 4, or vice versa, producing the image 4 of a record picture 3. Whilst the lens 2 is shown as an elementary lens, it may be any appropriate optical system.

5 indicates a blackened partition providing an aperture 6. Said aperture may contain a translucent screen 7.

8 is any appropriate optical system which produces in the plane of the aperture 6 a substantially plane image 9 of the object 4. Said image is then photographed by the lens 2, operating in conjunction with any suitable arrangement which prevents displacement of the whole image on the film due to the movement of the lens 2 and the film. In the case shown, the moving lens 2 is combined (as described in our application Serial No. 64,327, filed Nov. 30, 1915) with a fixed lens (or lens system) 10 arranged between it and the film; such combination being appropriately focussed to prevent movement of the image 3 relatively to the film. This focussing may be permanent, and all subsequent focussing adjustments may be made by means of the optical system 8. The image impressed on the film is limited to that exhibited by the aperture 6 and the impression of extraneous objects on the film is thereby prevented. Similarly upon reversing the process and projecting the picture 3, the partition 5 cuts off portions of adjacent pictures 3 projected by each of the lenses 2 in addition to its own corresponding picture 3 and the image finally projected to the position 4 is only that exhibited at the aperture 6.

In practice the gate or screen in front of the lenses 2 has an aperture 11 of such size as to expose several of said lenses simultaneously so that in taking photographs several pictures 3 are under exposure at the same moment, and in projecting the images of such several pictures are combined in the aperture 6 and on the exhibition screen.

It may be mentioned that the proper focussing of the system 2, 10, to prevent movement of the image, is readily attained when using a series of lenses 2; it being only necessary to secure that condition of focus in which the pitch of the image 3 equals the pitch of the lenses 2; i. e., in which any fixed point of the object appears the same distance apart between successive pictures as the distance apart of the centres of the lenses 2.

It will be noted that since the object ultimately photographed is a plane figure the images 3 are identical to the extent that they differ (if at all) only by the variation in position of moving objects due to the successive times of mean exposure resulting from the progressive entrance into the field of the corresponding lenses 2, and they consequently blend satisfactorily upon projection.

Fig. III shows the invention constructed as a camera, 12 indicates an enclosing box. The film 1 is fed from and onto spools 13 and is passed through the gate 14 by the drive mechanism 15. 10 is the large fixed lens. The series of lenses 2 is constructed as an endless chain 16 (Fig. V) which passes over the drums 17 and is driven, together with the mechanism 15 by the crank 18. 11 is the aperture through which the lenses 2 are exposed. At the front of the camera is the optical system 8 fitted with focussing means 19. Said system 8 throws an image into the aperture of the partition 5, in which aperture may be placed the translucent screen 7. Fig. IV shows the general arrangement for projection, which is the same as Fig. III with the box 12 omitted, and a source of light 20 and a condenser 21 added.

Claims:

1. In means for taking or projecting a series of pictures, the combination of means for moving a film, an optical system near to the film and including a lens for each image upon the film and movable with the film, a second optical system remote from the film and an apertured partition between said systems, said systems being arranged with relation to one another to produce in the aperture of said partition a substantially plane image for projection by the other, said aperture limiting the area of the image projected.

2. In means for taking or projecting a series of pictures, the combination of means for moving a film, an optical system near to the film said system including a lens for each image on the film and movable with the film and a fixed lens interposed between the film and the movable lenses, a second optical system remote from the film, an apertured partition between said systems, said systems being arranged with relation to one another to produce in the aperture of said partition a substantially plane image for projection by the other, said aperture limiting the area of the image projected.

3. In means for taking or projecting a series of pictures, the combination of means for moving a film, an optical system near to and in front of the film and including lenses movable with the film, a second optical system remote from the film and an apertured partition arranged between said optical systems to frame an image formed by one of them, and a translucent screen in the aperture of said partition.

4. The combination of means for moving a film, an optical system in front of the film and including a series of lenses moving with the film and so arranged that if acting as a projector they superimpose several images in a common focal plane, a partition in said plane providing an aperture limited to the size of a single image so projected, and a further optical system in front of said partition.

In testimony whereof we affix our signatures.

C. W. R. CAMPBELL.
FRANK G. A. ROBERTS.